United States Patent
Seethaler et al.

(10) Patent No.: US 9,806,606 B2
(45) Date of Patent: Oct. 31, 2017

(54) MULTI-MODAL BATTERY PACK

(75) Inventors: Kenneth S. Seethaler, Wake Forest, NC (US); Jeremy R. Carlson, Cary, NC (US); Larry G. Estes, Durham, NC (US); Hiromitsu Yamaguchi, Hiratsuka (JP); Shigefumi Odaohhara, Yamato (JP); Takeshi Matsumoto, Fujisawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1734 days.

(21) Appl. No.: 12/539,348

(22) Filed: Aug. 11, 2009

(65) Prior Publication Data
US 2011/0037436 A1    Feb. 17, 2011

(51) Int. Cl.
*H02J 7/00* (2006.01)
*H02M 3/07* (2006.01)
*H02M 3/335* (2006.01)

(52) U.S. Cl.
CPC ......... *H02M 3/07* (2013.01); *H02M 3/33507* (2013.01)

(58) Field of Classification Search
USPC ......................................................... 320/137
See application file for complete search history.

(56) References Cited

U.S. PATENT DOCUMENTS

| | | | | |
|---|---|---|---|---|
| 5,874,823 | A * | 2/1999 | Suzuki ........................ | 320/125 |
| 6,910,143 | B2 * | 6/2005 | Odaohhara et al. .......... | 713/340 |
| 2004/0155661 | A1 * | 8/2004 | Field et al. .................. | 324/426 |
| 2005/0194933 | A1 * | 9/2005 | Arnold et al. ............... | 320/128 |
| 2007/0188136 | A1 * | 8/2007 | Oh ............................... | 320/115 |
| 2009/0184687 | A1 * | 7/2009 | Schroeder et al. ........... | 320/162 |
| 2009/0206797 | A1 * | 8/2009 | Chueh et al. ................. | 320/150 |
| 2009/0289603 | A1 * | 11/2009 | Mahowald .................... | 320/151 |

* cited by examiner

*Primary Examiner* — Arun Williams
(74) *Attorney, Agent, or Firm* — Ference & Associated LLC

(57) ABSTRACT

At least one embodiment of the invention provides a multi-modal rechargeable battery pack that can switch between charging algorithms dynamically. This dynamic switching can be accomplished in a wide variety of ways, for example via external command or automatically. At least one embodiment of the invention provides a system that can switch a multi-modal rechargeable battery pack between one or more of a runtime mode, a lifespan mode, and a quick charge mode.

14 Claims, 5 Drawing Sheets

MULTI-MODAL BATTERY PACK

BACKGROUND

The field of the invention is generally rechargeable battery packs commonly used in electronic devices. Electronic devices, particularly mobile electronic devices such as notebook computers, utilize battery packs to provide power to the device at times when the device is used without a fixed power source (e.g. AC wall outlet).

Current battery packs are designed as rechargeable. Over time, conventional rechargeable battery packs wear out; i.e. they lose the ability to hold the same amount of charge as when new. This is a natural consequence of cycling (charging and discharging) the battery. Conventional rechargeable battery packs are currently designed either to hold maximum charge in the cells and have a life span of approximately 1.5 years or use special firmware that controls the charging algorithms to obtain a longer life cycle battery pack at the expense of runtime and/or charging time (i.e. conventional battery packs having a 3 year/1000 cycle rating use the special firmware for reduced charging).

The inventors have recognized that at design time, there is an either or decision regarding battery cell charging level and life cycle extension. That is, the inventors have recognized that there are currently no battery packs that can dynamically switch between these tradeoffs and benefits.

BRIEF SUMMARY

At least one presently preferred embodiment of the invention provides a multi-modal rechargeable battery pack that can switch between charging algorithms dynamically. This dynamic switching can be accomplished in a wide variety of ways, for example via external command (e.g. user input) or automatically (e.g. by internal heuristics). At least one embodiment of the invention provides a system that can switch a multi-modal rechargeable battery pack between one or more of a runtime mode, a lifespan mode, and a quick charge mode.

In summary, one aspect of the invention provides an apparatus comprising: one or more processors; a multi-modal battery pack having one or more battery cells therein; and a program storage device tangibly embodying a program of instructions that when executed by the one or more processors enables the apparatus to: switch the multi-modal battery pack having the one or more battery cells therein between charging modes.

Another aspect of the invention provides a multi-modal battery pack comprising: one or more battery cells; and a program storage device tangibly embodying a program of instructions, the program of instructions comprising: program instructions configured to switch the multi-modal battery pack between charging modes.

A further aspect of the invention provides a tangible program storage device, readable by machine, embodying a program of instructions that when executed by a processor of the machine enables the machine to: switch a multi-modal battery pack having one or more battery cells therein between charging modes.

For a better understanding of the present invention, together with other and further features and advantages thereof, reference is made to the following description, taken in conjunction with the accompanying drawings, and the scope of the invention will be pointed out in the appended claims.

DETAILED DESCRIPTION

Figure 1:
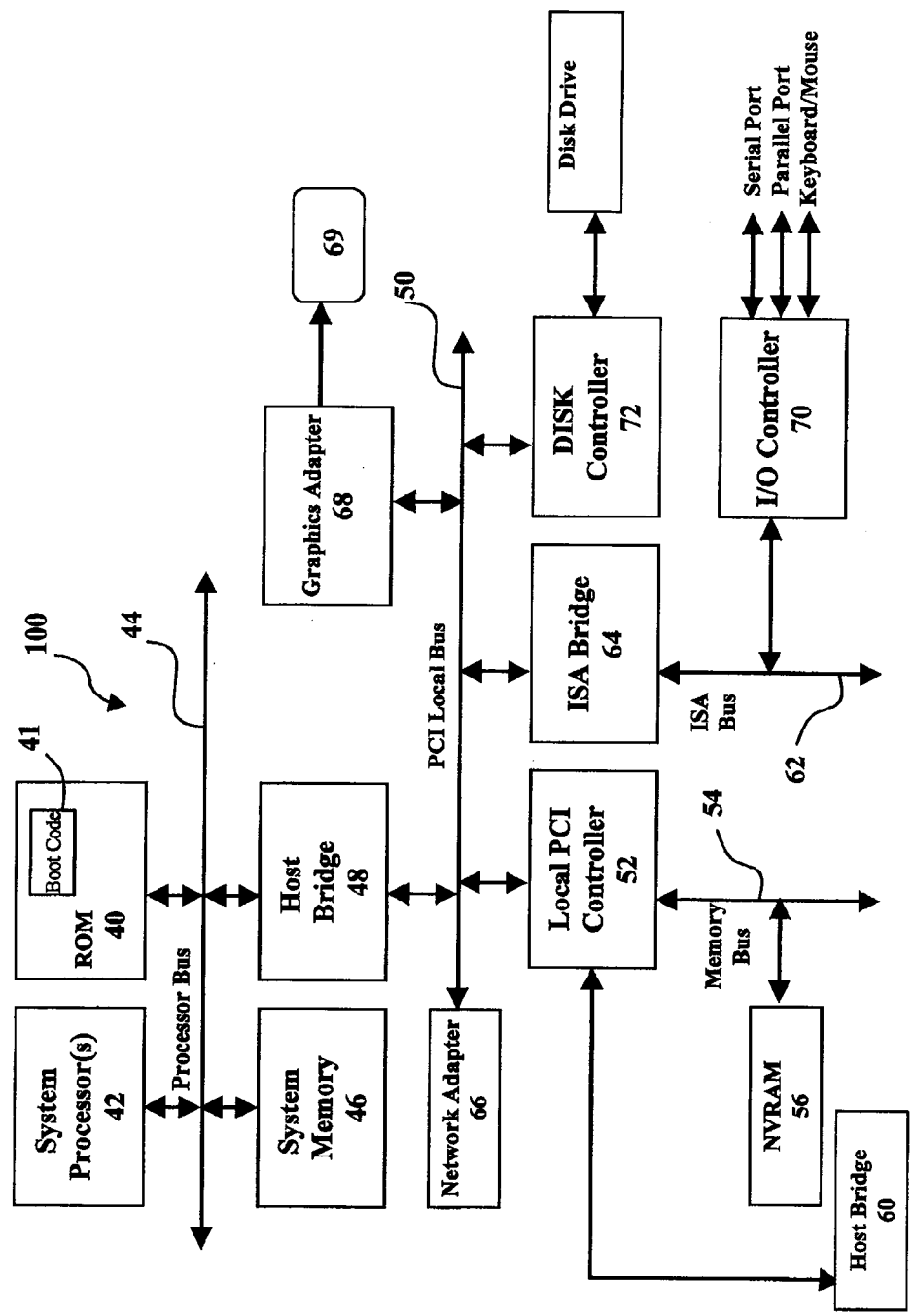
FIG. 1 illustrates a computer system according to one embodiment of the invention.

It will be readily understood that the components of the present invention, as generally described and illustrated in the figures herein, may be arranged and designed in a wide variety of different configurations in addition to the described presently preferred embodiments. Thus, the following more detailed description of the embodiments of the present invention, as represented in the figures, is not intended to limit the scope of the invention, as claimed, but is merely representative of selected presently preferred embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings. The following description is intended only by way of example, and simply illustrates certain selected presently preferred embodiments of the invention as claimed herein.

Because conventional rechargeable battery packs are currently designed to use one charging mode, i.e. either for maximum charge (and run time) or for extended life span (i.e. additional cycles), the inventors have recognized a need for multi-modal rechargeable battery packs that can dynamically switch between these tradeoffs and benefits. The inventors have recognized that users of mobile electronic devices such as notebook computers often subject the devices to varying use scenarios not easily accommodated by one power management approach.

The inventors have recognized that affording a power management module allowing dynamic and automatic switching between charging modes is particularly advantageous because of the wide variety of usage scenarios encountered by users of mobile electronic devices. For example, a user may know that they will be long without a wall outlet and desire a maximal charge placed in the battery cells and thus desire a runtime mode. Further, a user may constantly keep his or her electronic device plugged in, thus making a maximal charge (i.e. runtime mode) inappropriate and an extended life cycle mode more desirable.

Currently, users having battery packs configured for maximum charging often keep their notebook computers plugged into an AC power source and may rarely need a fully charged battery. However, upon using the device in a mobile fashion (i.e. running the device on battery power), these users may be unpleasantly surprised to learn the battery cell capacity has degraded even without excessive cycling. Thus, the inventors have recognized that such users could benefit from an alternative charging mode, e.g. providing a charging mode for less than maximal charging.

Moreover, if these users have a life span extending/energy conserving battery pack, they could infrequently require a maximal charge, yet not have a battery pack that is appropriately configured. Alternatively, users that require a fully charged battery frequently may appreciate the advantage of a longer-lived battery, yet only have a battery pack compatible with a maximum charging mode. Accordingly, the inventors have recognized a need for dynamically managing battery charging.

At least one presently preferred embodiment of the invention provides a power design such that a rechargeable battery pack can switch between charging algorithms dynamically. This dynamic switching can be accomplished in a wide variety of ways, for example via external command or automatically by internal heuristics. The automated dynamic switching can leverage a heuristic method that predicts future battery power needs based on recent usage patterns. Thus, at least one embodiment of the invention provides a system that can switch a rechargeable battery pack between one or more modes, for example a runtime mode, a lifespan mode, and a quick charge mode.

Referring now to FIG. 1, there is depicted a block diagram of an illustrative embodiment of a computer system 100. The illustrative embodiment depicted in FIG. 1 may be a notebook computer system, such as one of the ThinkPad® series of personal computers sold by Lenovo (US) Inc. of Morrisville, N.C. or a workstation computer, such as the Thinkstation®, which is also sold by Lenovo (US) Inc. of Morrisville, N.C. As will become apparent from the following description, however, the present invention is applicable to operation by any appropriately configured data processing system or other electronic device.

As shown in FIG. 1, computer system 100 includes at least one system processor 42, which is coupled to a Read-Only Memory (ROM) 40 and a system memory 46 by a processor bus 44. System processor 42, which may comprise one of the AMD™ line of processors produced by AMD™ Corporation or a processor produced by Intel® Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to LAN, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a keyboard, mouse, etc. In addition, I/O controller 70 supports external communication by computer system 100 via serial and parallel ports. The USB Bus and USB Controller (not shown) are part of the Local PCI controller (52).

Figure 2:
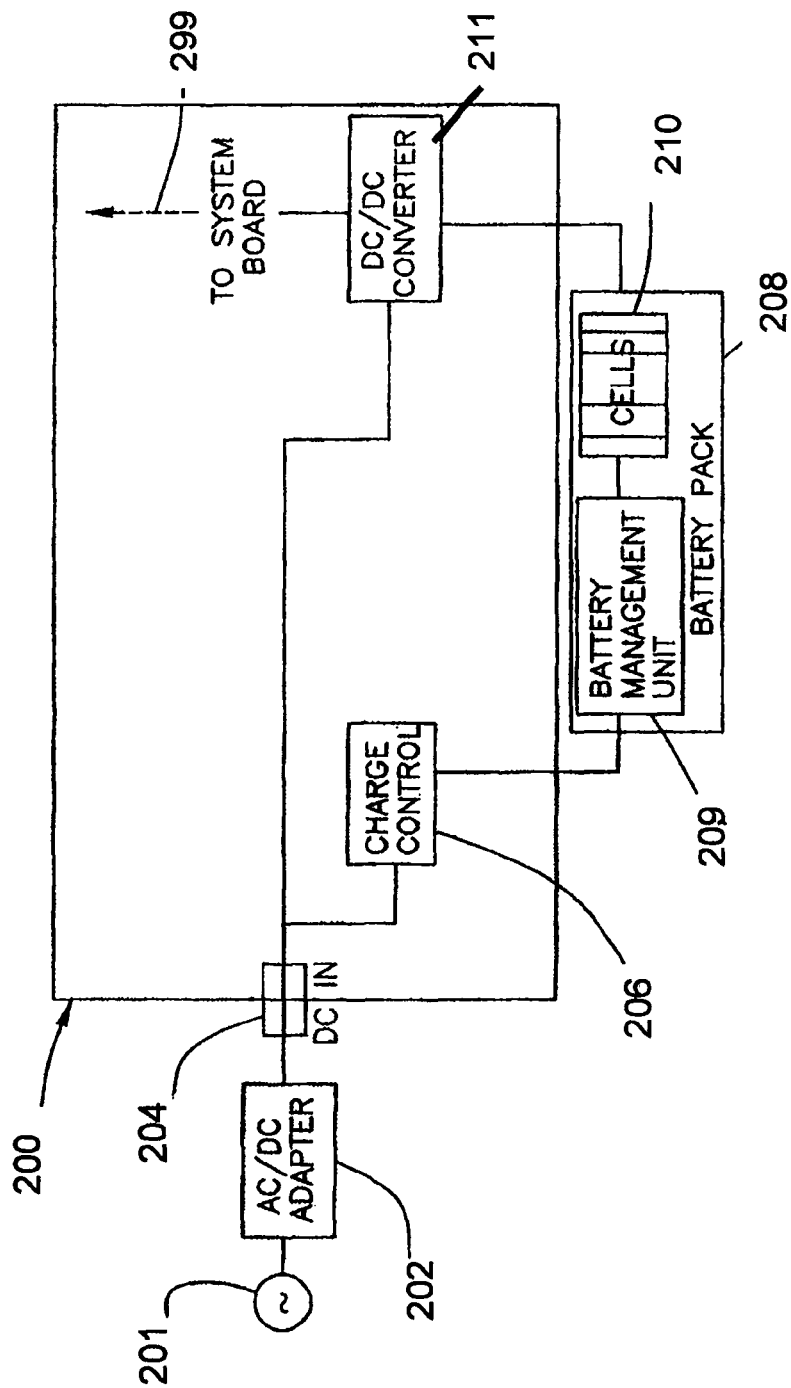
FIG. 2 illustrates an exemplary computer system having a battery pack and brick arrangement.

FIG. 2 illustrates a computer system 200 with a battery pack and brick arrangement. As shown, a wall outlet 201 can accommodate a plug (not shown in detail) extending from a wire which itself leads to an AC/DC adapter, or "brick", 202. In turn, a wire from here typically can be plugged into a DC input or jack 204. Accordingly, this normally constitutes one distinct system arrangement for powering a computer and (as is well known) recharging a battery pack.

For its part, battery pack 208 is typically integrated into or removable from a computer system 200; here, it is shown separately from the computer system 200 merely for the purpose of clear illustration. Typically, battery pack 208 will include a battery management unit 209 and battery cells 210 (e.g. Panasonic® cylindrical 18650 cells), wherein the management unit 209 manages the charge provided to and from the cells 210 so as to facilitate recharging of the cells 210 and powering of the computer system 200, respectively.

Brick 202 and battery pack 208, for their part, both feed into a DC/DC converter 211 as is well-known, and this in turn serves to power the computer system 200 (via connection 299). Further, a charge control arrangement 206 typically included to facilitate the charging of battery cells 210 by the DC power source (which includes adapter or brick 202). Generally, charge control arrangement 206 will communicate with the battery management unit 209 (e.g. via a "SMART" battery arrangement or other serial communication standard) so as to ascertain the state of the battery cells 210 and to determine the level of current (originating here from AC/DC adapter 202) needed to be provided to cells 210 by way of recharging, or continuing to recharge, the cells 210.

Figure 3:
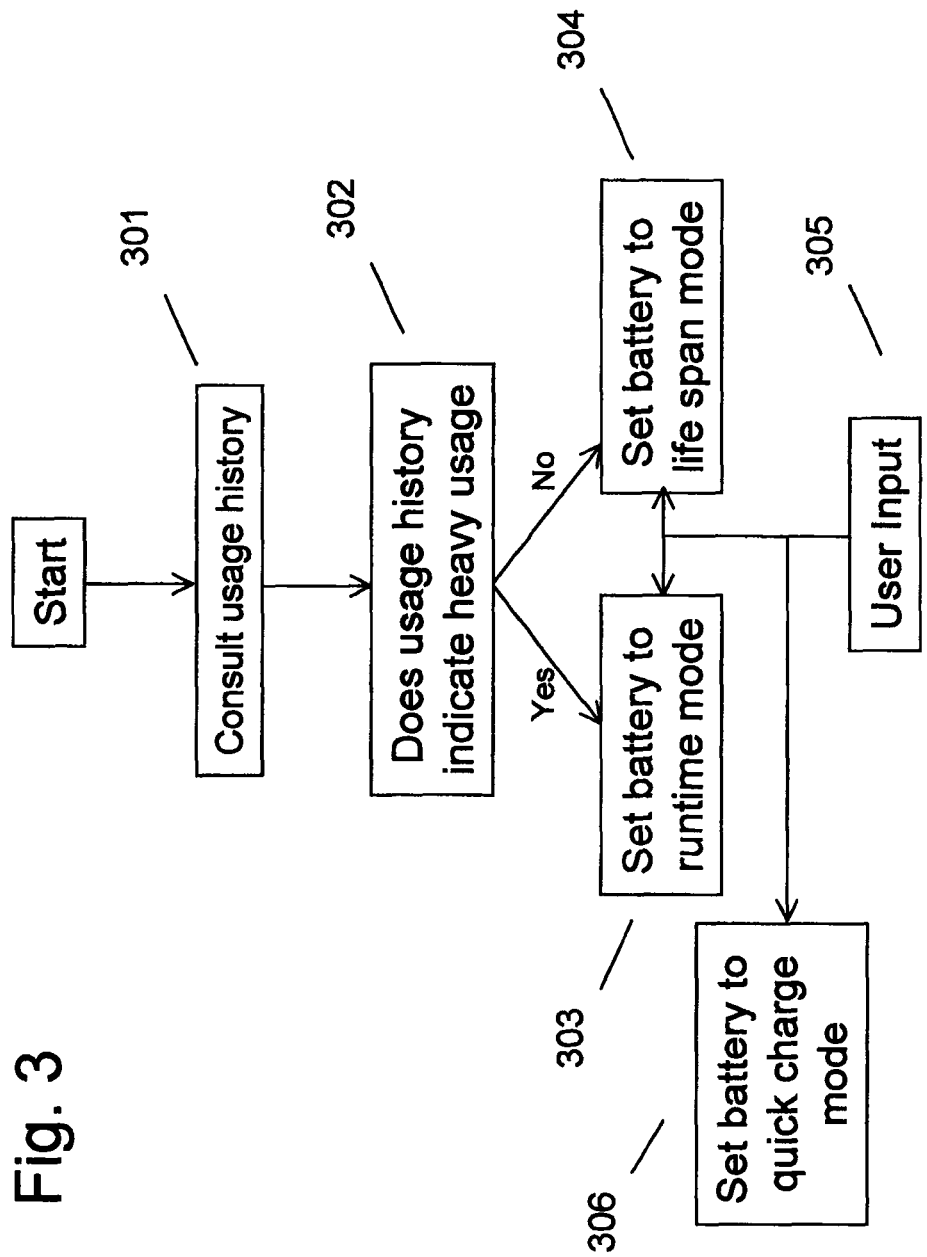
FIG. 3 illustrates a method of switching between charging modes according to one embodiment of the invention.

Referring to FIG. 3, a non-limiting and exemplary presently preferred embodiment of the invention providing battery pack management via dynamically switching between charging modes is depicted. It is presently preferred that as a default, automatic switching is set as the default, allowing the computer system to automatically determine the appropriate charging mode as described herein. An appropriately configured manger module, e.g. implemented in battery management unit 209, first consults a usage history at 301. The manger module leverages heuristics to dynamically determine the appropriate charging algorithm. This could be as simple as determining the average of battery cycles/AC usage over a predetermined time ("recent usage").

By way of non-limiting example, if the manager module determines that the usage history indicates heavy usage, e.g. a high number of battery cycles (charge and discharge) over the predetermined time at 302, the manager module switches the battery back into runtime mode at 303. Runtime mode corresponds to a charging scenario wherein the rechargeable battery pack is charged to a maximum amount, e.g. 100%, by implementing the appropriate charging algorithm. Thus, in runtime mode the battery cells will be charged maximally, affording the user increased runtime power for greater mobile usage.

Alternatively, if at 302 the manager module determines that usage is not heavy, at 304 the rechargeable battery pack is set to lifespan mode. Lifespan mode corresponds to a charging scenario discussed herein, with reference to FIG. 4, wherein the rechargeable battery packs are charged only to a predetermined fraction of maximum, e.g. 90%, by implementing the appropriate charging algorithm. Preferably the manager module is also appropriately configured for receiving user-input at 305 (e.g. via graphical user interface), allowing the user to switch to the mode of choice.

Moreover, there are preferably a variety of modes available. For example, the user may select to set the battery cells to quick charge mode 306, such as in the case where the user will have limited time to charge (e.g. at an airport), or to runtime or lifespan modes, as desired. Preferably, irrespective of which mode is chosen (be it selected automatically or via user selection) the "battery gauge" masks this from the user. For example, if the lifespan mode is selected, a full (100%) charge will be indicated by the "battery gauge" when charging is complete, even though in reality the battery cells are only charged fractionally (e.g. 90%).

Figure 4:
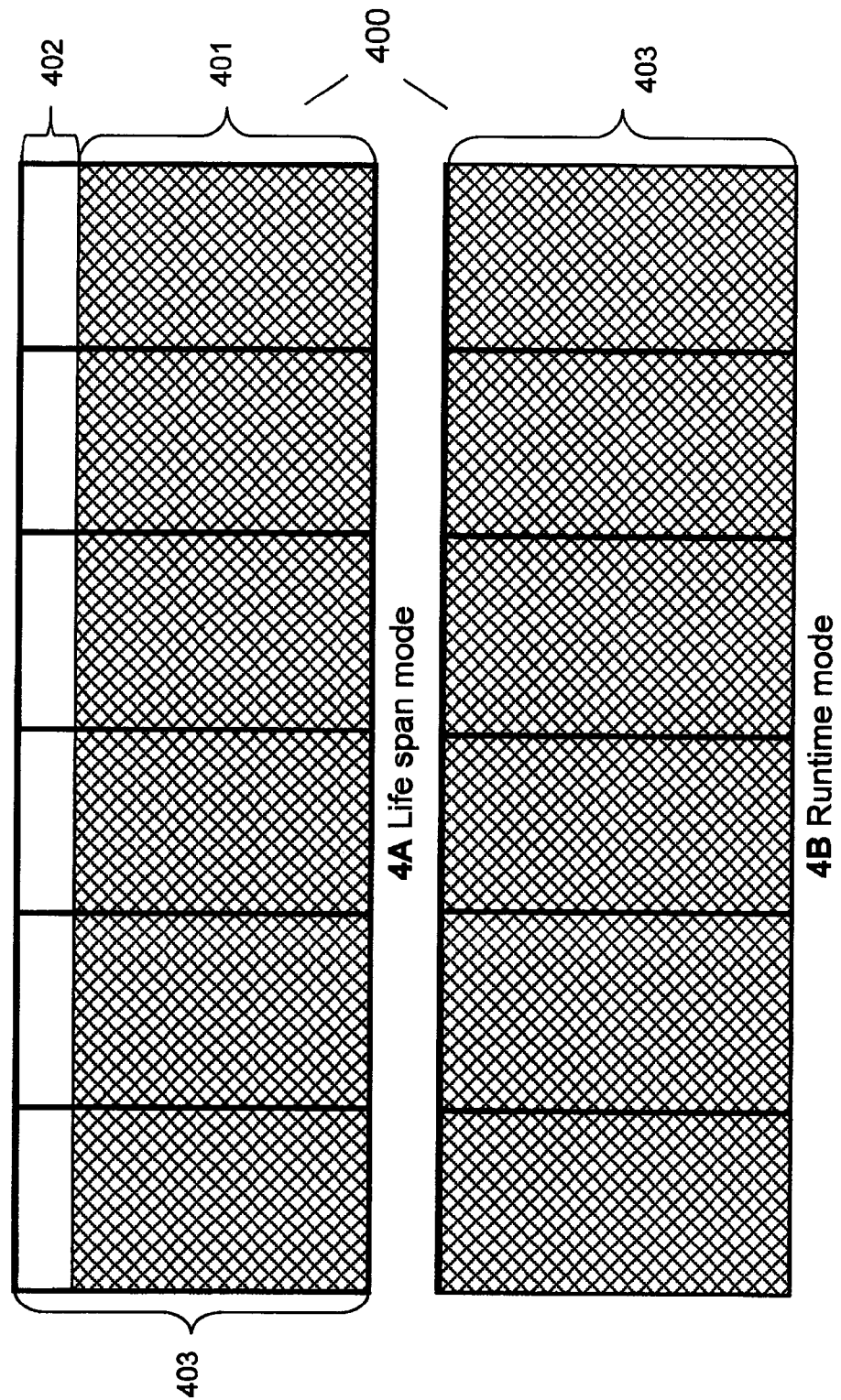
FIG. 4(A-B) illustrates rechargeable battery cells according to one embodiment of the invention FIG. 5 graphically illustrates life span and charge information for a rechargeable battery pack according to one embodiment of the invention.

Referring now to FIG. 4, a set of six rechargeable battery cells 400 is illustrated. FIG. 4A illustrates the battery cells 400 in lifespan mode, wherein they receive a fraction 401 of the maximal charge 403, e.g. 90%, and have remaining capacity 402. This can be accomplished in a variety of ways (e.g. charging to a fractional voltage, modifying the charging algorithm, etc.). Presently preferred lifespan mode parameters are a charge voltage limit of 4.1 V and a charge rate of 0.3C (or 0.825 Amp assuming 2.75 Ah nominal capacity, per cell). This will have the resultant effect of extending the battery cells' life span 2-3 times that of runtime mode, allowing for more cycles prior to failure as discussed further herein with respect to FIG. 5.

FIG. 4B illustrates the battery cells 400 in runtime mode, wherein they receive a maximal charge 403 for maximum power. Presently preferred runtime mode parameters are a charge voltage limit of 4.2V and a charge rate of 0.5C (or 1.375 Amp assuming 2.75 Ah nominal capacity, per cell). This has the effect of allowing the battery to fully charge and provide power to the electronic device for an extended time, yet results in a shorter life span (reduced number of cycles), as discussed herein with respect to FIG. 5. Preferably, irrespective of the mode chosen, again the manager module will seamlessly scale the output readings and thus allow the "battery gauge" to indicate a scaled power level.

Figure 5:
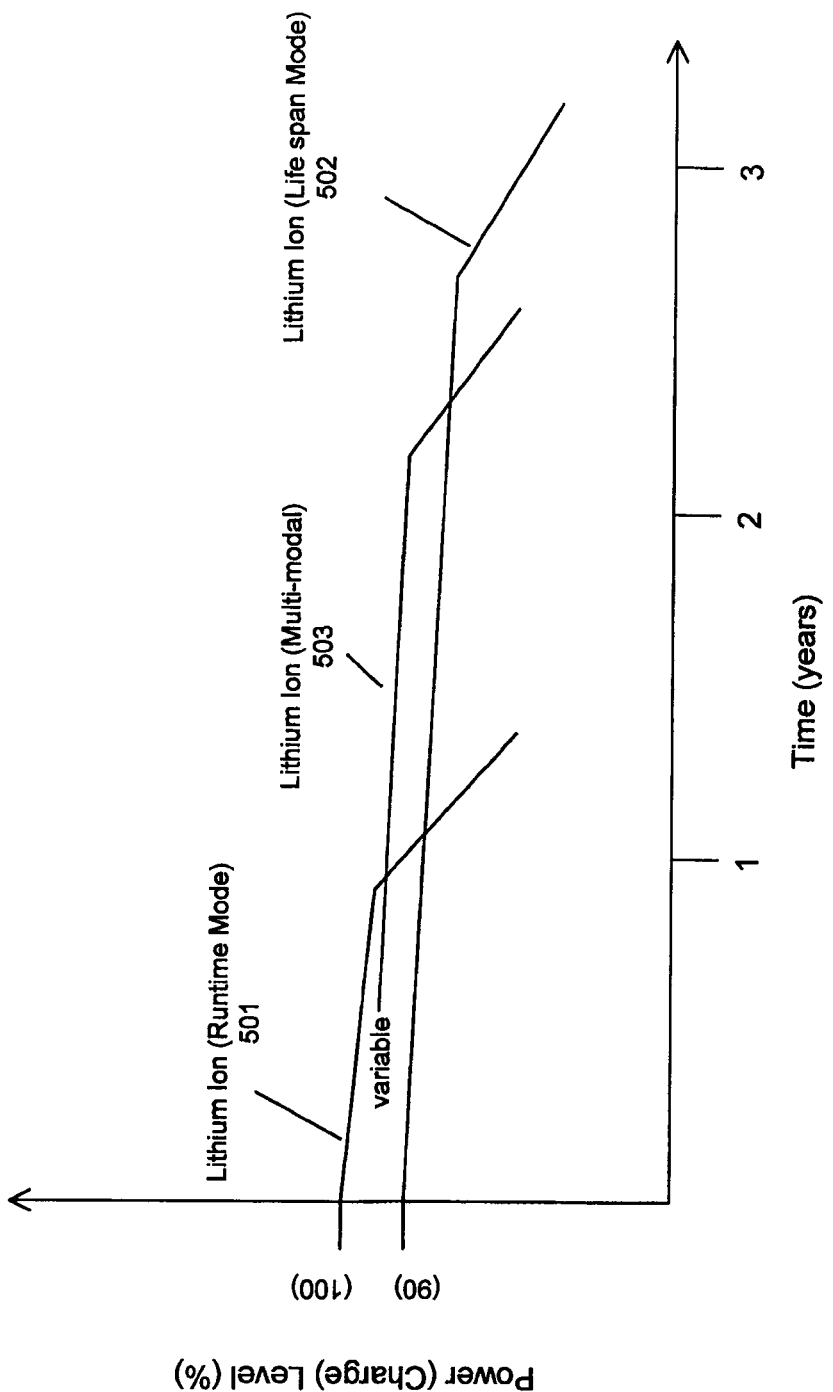

FIG. 5 graphically illustrates life spans for lifespan mode, runtime mode, and multi-modal exemplary battery packs according to one embodiment of the invention. As shown, a lithium ion battery pack in runtime mode 501 will be charged maximally (i.e. 100%) but will only have a useful life span of approximately 1.5 years. A lithium ion battery pack in lifespan mode 502 will have a maximum life span exceeding approximately 3 years, but will only be charged to a fraction of maximal (e.g. 90%), offering reduced runtime. A multi-modal lithium ion battery pack 503 as described herein will dynamically be switched between lifespan mode and runtime mode, affording both maximum runtime (i.e. when maximally charged) and extending overall life span (to approximately over 3 years) by virtue of receiving a fractional charge in certain circumstances (i.e. when switched to lifespan mode).

In brief recapitulation, at least one embodiment of the invention provides a multi-modal battery pack that allows dynamic switching between charging modes. Thus, users are afforded the best of maximum runtime and maximum life span, within one battery pack, at their selection and/or based on their usage profile.

It should be understood that many of the functional characteristics of the inventive system described in this specification may be implemented as modules. Modules may include hardware circuits such as one or more processors with memory, programmable logic, and/or discrete components. The hardware circuits may perform hardwired logic functions, execute computer readable programs stored on tangible storage devices, and/or execute programmed functions. The computer readable programs may in combination with a computer system and the other described elements perform the functions of the invention.

It will be readily understood by those having ordinary skill in the art that embodiments of the present invention may take the form of an entirely hardware embodiment or an embodiment containing both hardware and software elements. An embodiment that is implemented in software may include, but is not limited to, firmware, resident software, microcode, etc.

The computer readable programs may be stored in tangible computer/machine-readable (apparatus readable) medium. Examples of a computer/machine-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Accordingly, elements of the present invention may be implemented on at least one electronic device running suitable software programs. These may also be implemented on at least one Integrated Circuit or part of at least one Integrated Circuit. Thus, it is to be understood that the invention may be implemented in a combination of both hardware and software. Again, computer/machine-readable programs may in combination with an electronic device perform the functions of the invention.

It should be understood and appreciated that battery cells, as discussed and broadly contemplated herein, can be employed in a wide variety of operating environments, including but not limited to computers, cell phones, and other mobile devices. Thus, while the foregoing discussion presents a computer system as a possible operating environment for a multi-modal battery pack according to embodiments of the invention, it of course should be understood that this is provided by way of non-limiting example. Battery cells, as such, can act to power a load device or other item that is configured for being battery powered. In the case of a computer, a battery cell can serve to power various components including a main memory while in the case of an automobile a battery cell can serve to power an electric motor which propels motion in the automobile.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

In the drawings and specification there has been set forth a preferred embodiment of the invention and, although specific terms are used, the description thus given uses terminology in a generic and descriptive sense only and not for purposes of limitation.

If not otherwise stated herein, it is to be assumed that all patents, patent applications, patent publications and other publications (including web-based publications) mentioned and cited herein are hereby fully incorporated by reference herein as if set forth in their entirety.

What is claimed is:

1. An apparatus comprising:
   one or more processors;
   a multi-modal battery pack having one or more battery cells therein; and
   a program storage device housed within said multi-modal battery pack, the program storage device tangibly embodying a program of instructions that when executed by the one or more processors enables the multi-modal battery pack to:
   automatically determine an appropriate charging mode; and
   switch the one or more battery cells therein between charging modes, the charging modes comprising:
   a lifespan mode wherein the one or more battery cells are fractionally charged;
   a runtime mode wherein the one or more battery cells are charged; and
   a quick charge mode wherein the one or more battery cells are charged in a compressed time period;
   said apparatus further comprising one or more battery powered components operatively connected to the multi-modal battery pack.

2. The apparatus according to claim 1, wherein the program of instructions further enables the apparatus to:
   consult a usage history; and
   automatically determine an appropriate charging mode based on the usage history.

3. The apparatus according to claim 1, wherein the apparatus is an automobile.

4. The apparatus according to claim 1, wherein the program of instructions further enables the apparatus to automatically alter a battery gauge appropriately for a selected mode.

5. The apparatus according to claim 1, wherein the quick charge mode comprises a mode wherein the one or more battery cells are charged in a limited time period.

6. A multi-modal battery pack comprising:
   one or more battery cells; and
   a program storage device tangibly embodying a program of instructions, the program of instructions comprising:
   program instructions configured to switch the multi-modal battery pack between charging modes, the charging modes comprising:
   a lifespan mode wherein the one or more battery cells are fractionally charged;
   a runtime mode wherein the one or more battery cells are charged; and
   a quick charge mode wherein the one or more battery cells are charged in a compressed time period.

7. The battery pack according to claim 6, wherein the program of instructions further comprises:
   program instructions configured to consult a usage history; and
   program instructions configured to automatically determine an appropriate charging mode based on the usage history.

8. The battery pack according to claim 6, wherein the program of instructions further comprises:
   program instructions configured to receive one or more user inputs for selecting a charging mode.

9. The battery pack according to claim 6, wherein the program of instructions further comprises:
   program instructions configured to automatically alter a battery gauge appropriately for a selected mode.

10. A tangible program storage device, readable by machine, embodying a program of instructions that when executed by a processor of the machine enables the machine to:
    switch a multi-modal battery pack having one or more battery cells therein between charging modes, the charging modes comprising:
    a lifespan mode wherein the one or more battery cells are fractionally charged;
    a runtime mode wherein the one or more battery cells are charged; and
    a quick charge mode wherein the one or more battery cells are charged in a compressed time period.

11. The apparatus according to claim 1, wherein the quick charge mode is user selectable.

12. The apparatus according to claim 11, wherein the runtime mode and the lifespan mode are user selectable.

13. The apparatus according to claim 12, wherein user selection switches to the quick charge mode.

14. The apparatus according to claim 1, wherein the apparatus is a notebook computer.

\* \* \* \* \*